(12) United States Patent
Sako et al.

(10) Patent No.: US 8,903,423 B2
(45) Date of Patent: Dec. 2, 2014

(54) DATA COMMUNICATION APPARATUS, DATA COMMUNICATION METHOD, AND DATA COMMUNICATION PACKET

(75) Inventors: Yoichiro Sako, Tokyo (JP); Toshiro Terauchi, Tokyo (JP); Masamichi Asukai, Kanagawa (JP); Mitsuru Takehara, Tokyo (JP); Takatoshi Nakamura, Ibaraki (JP); Makoto Inoue, Tokyo (JP); Kosei Yamashita, Kanagawa (JP); Yasushi Miyajima, Kanagawa (JP); Toru Sasaki, Tokyo (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1272 days.

(21) Appl. No.: 11/887,170

(22) PCT Filed: Feb. 24, 2006

(86) PCT No.: PCT/JP2006/303420
§ 371 (c)(1),
(2), (4) Date: Sep. 26, 2007

(87) PCT Pub. No.: WO2006/112148
PCT Pub. Date: Oct. 26, 2006

(65) Prior Publication Data
US 2009/0131071 A1    May 21, 2009

(30) Foreign Application Priority Data

Mar. 31, 2005   (JP) ................... 2005-102069

(51) Int. Cl.
| | |
|---|---|
| *H04W 24/00* | (2009.01) |
| *A63F 13/30* | (2014.01) |
| *H04M 1/725* | (2006.01) |
| *H04W 8/00* | (2009.01) |
| *H04L 29/06* | (2006.01) |
| *H04W 4/02* | (2009.01) |
| *H04W 8/18* | (2009.01) |

(52) U.S. Cl.
CPC ............ *A63F 13/12* (2013.01); *H04M 1/7253* (2013.01); *H04M 1/72572* (2013.01); *H04W 8/005* (2013.01); *H04L 67/38* (2013.01); *A63F 2300/204* (2013.01); *A63F 2300/5573* (2013.01); *H04M 2250/04* (2013.01); *H04M 2250/12* (2013.01); *H04W 4/02* (2013.01); *H04W 8/18* (2013.01)
USPC ...................................... 455/456.2

(58) Field of Classification Search
USPC ............ 455/456.1, 414.1, 456.3, 452.2, 3.03, 455/440, 567, 568.1, 406, 463, 450, 41.2, 455/67.13, 411; 340/568.1, 531; 370/449; 701/207; 379/201.01
See application file for complete search history.

(56) References Cited

U.S. PATENT DOCUMENTS 6,813,491 B1 * 11/2004 McKinney ................ 455/414.1
7,158,026 B2 * 1/2007 Feldkamp et al. ............ 340/531

(Continued)

FOREIGN PATENT DOCUMENTS

| EP | 1458136 A1 | 9/2004 |
|---|---|---|
| JP | 9-160986 | 6/1997 |

(Continued)

OTHER PUBLICATIONS

Yatani et al., Information transfer techniques for mobile devices by "toss" and "swing" actions. Mobile Computing Systems and Applications. Proceedings of the Sixth IEEE Workshop on Mobile Computing Systems and Applications. WMCSA 2004. Cumbria, UK. Dec. 2-3, 2004:144-51.

*Primary Examiner* — Kiet Doan
(74) *Attorney, Agent, or Firm* — Wolf, Greenfield & Sacks, P.C.

(57) ABSTRACT

A data communication apparatus capable of creating a new type of communication is provided. Motion information obtaining means 33 obtains information on the motion of an arbitrary apparatus. An other-party apparatus motion determination section 21 makes a determination as to the motion of the arbitrary apparatus on the basis of the information on the motion of the arbitrary apparatus, the information being obtained by the motion information obtaining means 33. A communication determination section 22 determines whether or not communication is to be performed with an arbitrary apparatus on the basis of the motion determination output by the other-party apparatus motion determination section 21. When it is determined by the communication determination section 22 that communication is to be performed, predetermined data communication is started with the arbitrary apparatus.

17 Claims, 13 Drawing Sheets

(56) References Cited

U.S. PATENT DOCUMENTS

| | | | |
|---|---|---|---|
| 7,831,199 B2* | 11/2010 | Ng et al. | 455/3.06 |
| 2002/0164997 A1* | 11/2002 | Parry | 455/456 |
| 2003/0045296 A1 | 3/2003 | Burr | |
| 2004/0037405 A1* | 2/2004 | Kotik et al. | 379/201.01 |
| 2004/0179545 A1* | 9/2004 | Erola et al. | 370/449 |
| 2004/0198344 A1* | 10/2004 | Pitt et al. | 455/426.1 |
| 2005/0064914 A1* | 3/2005 | Gough | 455/567 |
| 2005/0101336 A1* | 5/2005 | Otsuka | 455/456.3 |
| 2005/0227707 A1* | 10/2005 | Law et al. | 455/456.1 |
| 2006/0022822 A1* | 2/2006 | Wong et al. | 340/568.1 |
| 2006/0058036 A1* | 3/2006 | Watanabe et al. | 455/456.1 |

FOREIGN PATENT DOCUMENTS

| | | |
|---|---|---|
| JP | 2002-165009 A | 6/2002 |
| JP | 2004-343495 A | 5/2003 |
| JP | 2004-214846 A | 7/2004 |
| JP | 2004-274586 A | 9/2004 |
| JP | 2004/343495 A | 12/2004 |

\* cited by examiner

DATA COMMUNICATION APPARATUS, DATA COMMUNICATION METHOD, AND DATA COMMUNICATION PACKET

TECHNICAL FIELD

The present invention relates to a data communication apparatus for communicating, for example, music data, voice data of a conversation, electronic mail data, and the like, to a data communication method for use therewith, and to data communication packets.

BACKGROUND ART

When a user is to perform communication with another user by using a portable-type data communication apparatus, such as a portable phone terminal, usually, the phone number of the other party is obtained in advance, and a communication line (communication channel) is formed by using the obtained phone number.

For example, Japanese Unexamined Patent Application Publication No. 2003-233564 discloses an apparatus in which a communication party is selected by using a listed address note in which communication parties are listed in order sorted on the basis of evaluation values indicating the degree of friendship, and communication is performed.

In recent years, in addition to the above-described portable phone terminals, as data communication terminals, various types, such as audio playback apparatuses having a communication function, PDAs (Personal Digital Assistants), or portable game machines having a communication function, have been proposed.

Also, a communication infrastructure is not limited to a portable telephone network, and in particular, as a communication infrastructure for short-distance communication, communication means using infrared rays, Bluetooth, a wireless LAN (Local Area Network) in compliance with the IEEE 802.11 standard, have been provided.

As such a short-distance communication infrastructure has appeared, unlike communication of the related art using portable phone terminals, it is expected that the likelihood of communication with an unknown communication party will increase. As a result, it is expected that a new type of communication world will be created.

For example, when there are plural people jogging in the same direction at substantially the same speed, communication can be performed among the data communication terminals owned by the plural people so that music content listened to by the plural people can be shared. For example, if the plural people are romantically involved, it is possible to have a music world of only their own while jogging.

When a person having a portable game machine with a communication function wants to play a combat game with an arbitrary person who similarly has a portable game machine with a communication function at a certain place, it is considered that a portable game machine of a person at rest in that place rather than a person passing through the place is detected, and communication is performed.

A case may occur in which, while a person is at rest in a certain place, he/she wants to perform communication with a person passing through the place while jogging or with a person passing through the place while walking by using a data communication apparatus.

An object of the present invention is to create a new type of communication world such as that described above.

DISCLOSURE OF INVENTION

In order to solve the above-described problems, a data communication apparatus according to the present invention includes: obtaining means for obtaining information on the motion of an arbitrary apparatus; motion determination means for determining the motion of the arbitrary apparatus on the basis of the information on the motion obtained by the obtaining means; communication determination means for determining whether or not communication is to be performed with the arbitrary apparatus on the basis of motion determination output by the motion determination means; and communication means for starting predetermined data communication with the arbitrary apparatus when the communication determination means determines that communication is to be performed with the arbitrary apparatus.

According to the data communication apparatus in accordance with the present invention, the motion of an arbitrary apparatus is determined by determination means, and it is determined whether or not communication is to be performed with the arbitrary apparatus on the basis of the determination output of the determination means. As a result, it is possible to perform data communication with an arbitrary apparatus that is moving in a predetermined manner.

According to the present invention, it is possible to perform data communication with an arbitrary apparatus that is moving in a predetermined manner, and it is possible to create a new type of communication world.

BEST MODE FOR CARRYING OUT THE INVENTION

Embodiments of a data communication apparatus and method according to the present invention will now be described below with reference to the drawings.

First Embodiment

A data communication apparatus according to a first embodiment is a portable terminal capable of performing short-distance wireless communication in a wireless manner, and performs data communication with another portable terminal in a specific moving state (assumed to include a static state in which there is no motion). In the portable terminal as a data communication apparatus of the first embodiment, it is assumed that a phone call is performed as an example of data communication.

Figure 2:
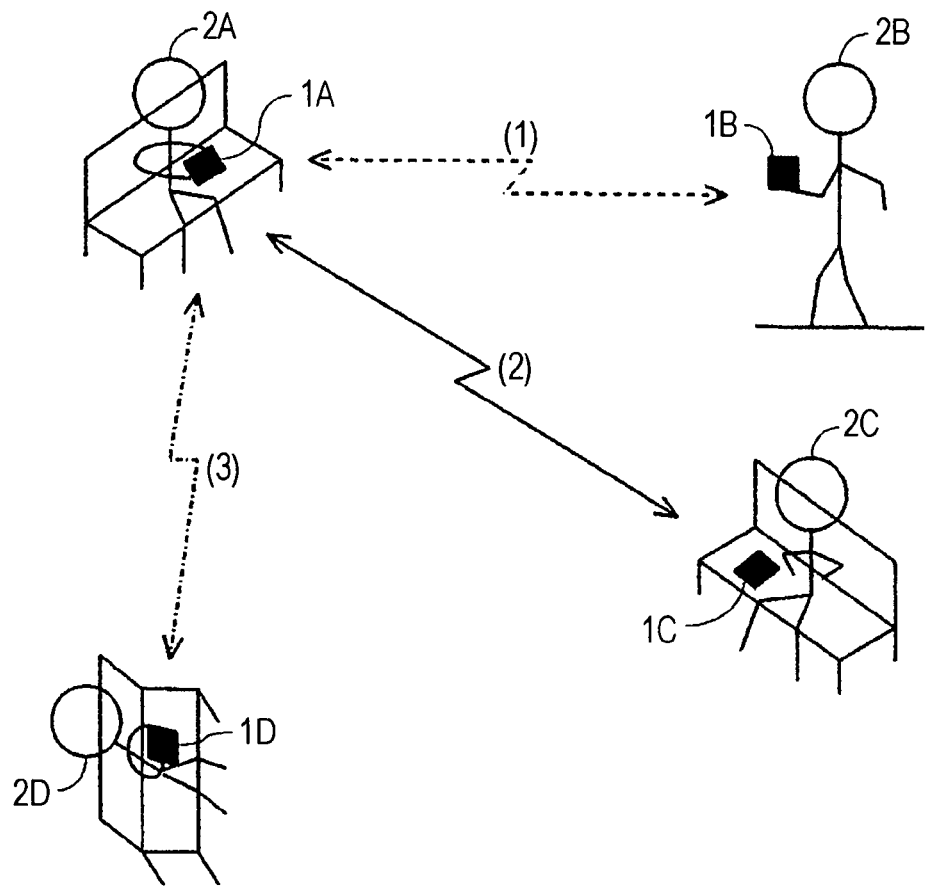
FIG. 2 illustrates several examples of the moving state of a portable terminal of another party with which the portable terminal of the first embodiment performs data communication.

FIG. 2 is an illustration showing several examples of the moving state of an other-party portable terminal with which data communication is performed. FIG. 2 shows a case in which a portable terminal 1A owned by a user 2A performs data communication with an other-party portable terminal in a specific moving state, and also shows examples of three types of states as specific moving states of the other-party portable terminal.

In FIG. 2, a case (1) indicated by a dotted line shows a case in which a portable terminal 1B owned by a user 2B while walking and the portable terminal 1A perform communication with each other. In the case (1), the portable terminal 1B is moved, such as "moved at a predetermined speed", "moved up and down", or "vibrated", in accordance with the walking of the user 2B. Therefore, by detecting one of or a combination of those motions, it is determined whether or not the portable terminal 1B is being subjected to a specific motion while it is held by the user 2B while walking.

In FIG. 2, a case (2) indicated by a solid line shows a case in which a portable terminal 1C in a static state, which is placed at a fixed position away from a user 2C and the portable terminal 1A perform communication with each other. In the case (2), by detecting whether or not the portable terminal 1C is in a static state, it is determined whether or not the portable terminal 1C is a portable terminal that performs data communication with the portable terminal 1A.

A case (3) indicated by a short dashed line shows a case in which a portable terminal 1D for which a user 2D at rest sitting on a chair is performing some operation and the portable terminal 1A perform communication with each other. In the case (3), the portable terminal 1D is not completely at rest, but is in a state of slight motion as a result of the user 2D holding or operating the portable terminal 1D. Therefore, by detecting the state, it is possible to determine a specific moving state of the portable terminal 1D being held and operated by the user 2D.

At this point, in the first embodiment, the portable terminals 1A, 1B, 1C, and 1D each include a sensor for detecting the motion of the user terminal, and transmit information on the detected motion of the user terminal by, for example, broadcast destined for unspecified portable terminals by using wireless communication means. A portable terminal that is going to perform data communication obtains information on the motion of the terminal from another portable terminal and determines the motion of the other portable terminal.

In this case, for information on the motion of the user terminal, which is to be sent to another portable terminal, information detected by a sensor for detecting the motion may be used as is. Alternatively, a completely static state, a slight moving state, a walking state, or the like may be detected by the user terminal, and the detected result may be output. In the first embodiment, the latter case is adopted.

The type of data communication that should be performed with a portable terminal in a particular moving state may be set in each portable terminal in advance in a fixed manner. In this embodiment, it is possible for the user to select the motion of the other-party portable terminal with which data communication is desired to be performed from among, for example, a plurality of motion patterns that are registered in advance.

For the portable terminals 1A, 1B, 1C, and 1D, suffixes A, B, C, and D are used to distinguish portable terminals owned by the different users 2A, 2B, 2C, and 2D. However, in the following, when there is no need to distinguish users, suffixes are omitted, and the portable terminal 1 is used.

Example of Configuration of Portable Terminal of First Embodiment

Figure 1:
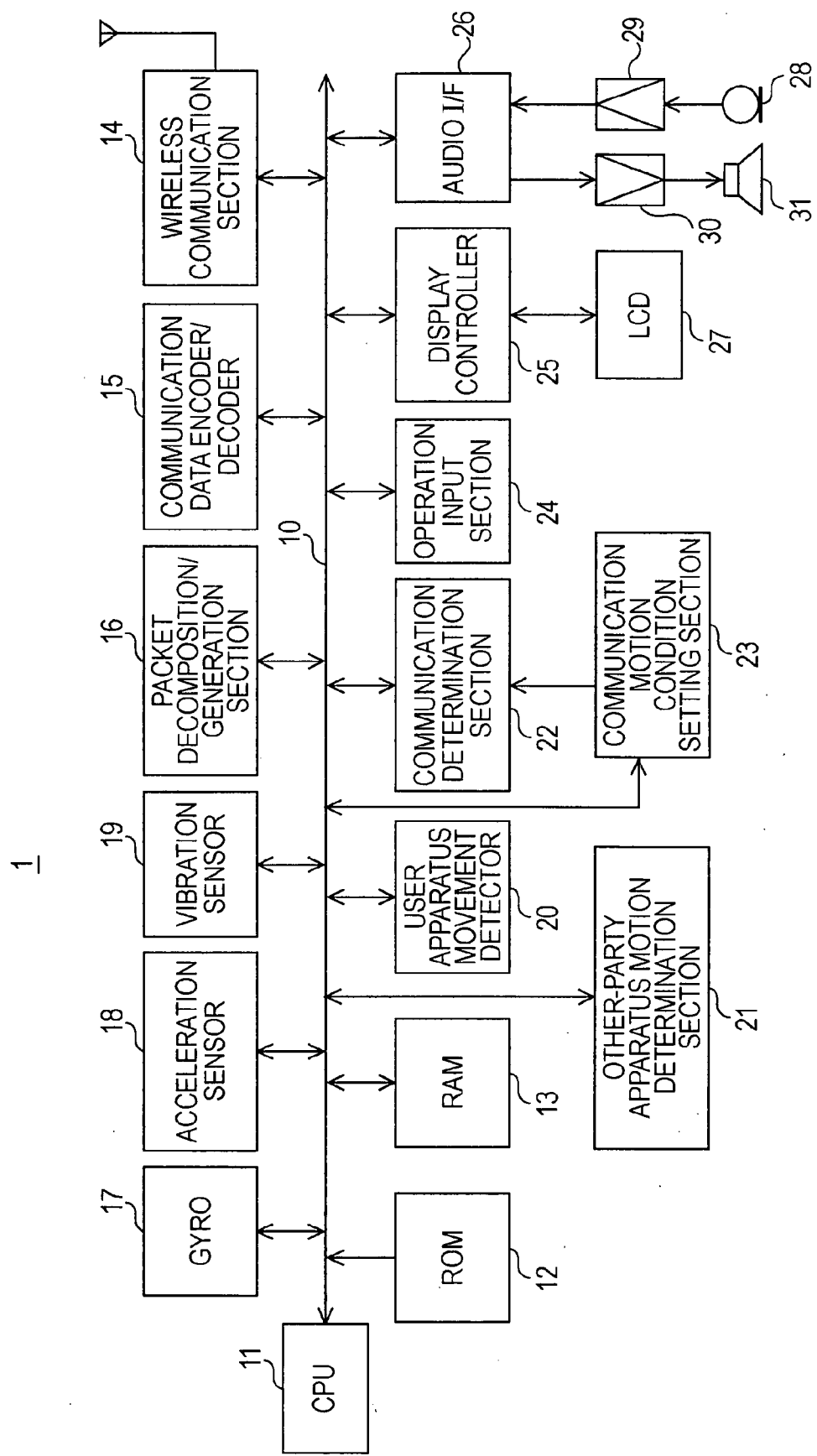
FIG. 1 shows an example of the configuration of hardware of a portable terminal as a first embodiment of a data communication apparatus according to the present invention.

FIG. 1 is a block diagram showing an example of the configuration of the hardware of a portable terminal 1 in the case of the first embodiment.

The portable terminal 1 of this example is configured in such a manner that a microcomputer is installed therein. A ROM (Read Only Memory) 12 and a RAM (Random Access Memory) 13 are connected to a CPU (Central Processing Unit) 11 via a system bus 10. The CPU 11 performs various kinds of processing in accordance with a program stored in the ROM 12 while using the RAM 13 as a work area.

A wireless communication section 14, a communication data encoder/decoder 15, and a packet decomposition/generation section 16 are further connected to the system bus 10. Also, in this example, a gyro 17, an acceleration sensor 18, and a vibration sensor 19 are connected to the system bus 10 for the purpose of detecting the motion of the user terminal.

In this example, the wireless communication section 14 is used to perform short-distance wireless communication with another portable terminal 1, and in this example, a wireless communication apparatus in compliance with the Bluetooth standard is used. The wireless communication section 14 is not limited to this example, and may perform communication via a wireless LAN in compliance with, for example, the IEEE 802.11 standard. The wireless communication section 14 may also perform communication by using infrared rays.

The communication data encoder/decoder 15 performs processing for encoding communication data transmitted via the wireless communication section 14 and also performs processing for decoding communication data received via the wireless communication section 14.

The packet decomposition/generation section 16 performs processing for packetizing (packet generation) communication data received from the communication decoding encoder/decoder 15 and sending the generated packets to the wireless communication section 14, and also performs processing for decomposing the packets of the communication data received via the wireless communication section 14 and transferring them to the communication data encoder/decoder 15, whereby they are decoded.

The gyro 17 detects the motion of the user terminal and the motion direction (the movement direction) thereof. The acceleration sensor 18 is used to detect up and down movement when, for example, the user jogs or walks carrying the portable terminal 1. The outputs of the gyro 17 and the vibration sensor 19 are also used to detect the fact that the user has jogged or walked carrying the portable terminal 1. The vibration sensor 19 is used to detect vibration that occurs in the portable terminal 1 when, for example, the user performs some kind of processing operation on the portable terminal 1 while holding it by hand.

A user apparatus motion detector 20, an other-party apparatus motion determination section 21, a communication determination section 22, and a communication motion condition setting section 23 are further connected to the system bus 10.

Upon receiving sensor outputs from the gyro 17, the acceleration sensor 18, and the vibration sensor 19, the user apparatus motion detector 20 generates information regarding what kind of motion (information on motion) the user apparatus is making. As described above, the outputs of the gyro 17, the acceleration sensor 18, and the vibration sensor 19 are combined to generate information on the motion of the user apparatus. In this example, motion information to be generated includes information capable of identifying a static state, a moving state, a jogging state, a walking state, a manual operation state, or the like, that is, information indicating which moving state.

The other-party apparatus motion determination section 21 receives, from the communication data encoder/decoder 15, information regarding the motion of an other-party portable terminal 1, which is received from the other-party portable terminal 1, and makes a determination as to the motion of the other-party portable terminal 1 on the basis of the information on the motion. Then, the other-party apparatus motion determination section 21 transfers the result of the motion determination of the other-party portable terminal 1 to the communication determination section 22.

The communication determination section 22 compares the determination result of the motion of the other-party portable terminal 1 output from the other-party apparatus motion determination section 21 with the motion condition information on the other-party portable terminal 1 for which data communication should be performed from the communication motion condition setting section 23, and performs control so that data communication between the user terminal and the other-party portable terminal is permitted when the determination result of the motion of the other-party portable terminal 1 satisfies the motion condition.

The communication motion condition setting section 23 holds communication motion condition information that is set and input by communication motion condition setting operation input (to be described later) performed by the user and sends the held communication motion condition information to the communication determination section 22. At this point, as will also be described later, the moving state of the other-party portable terminal 1, which can be selected and set as a communication motion condition in this example, is set to "static state", "while moving", "while jogging", "while walking", "being manually operated", or the like.

The user apparatus motion detector 20, the other-party apparatus motion determination section 21, the communication determination section 22, and the communication motion condition setting section 23 can also be configured by software processing performed by the CPU 11 in accordance with a program in the ROM 12.

An operation input section 24, a display controller 25, and an audio interface 26 are further connected to the system bus 10.

The operation input section 24 is used when the above-described communication motion condition for the other-party portable terminal with which data communication is to be performed is set and input, and includes a menu key and cursor keys.

In this example, an LCD (Liquid Crystal Display) 27 as a display apparatus is connected to the display controller 25. Then, for example, under the control of the CPU 11, a selection setting input screen when the above-described communication motion condition is selectively set and input is displayed on the display screen of the LCD 27 by the display controller 25. The user can perform a selection setting input of the communication motion condition while viewing the display screen of the LCD 27.

For example, when the user makes a menu display request via the operation input section 24, a menu list is displayed on the screen of the LCD 27. The user selects the item of "selection setting of communication motion condition" from the menu list. Then, on the display screen of the LCD 27, as a list of selection setting items with regard to the moving state of the other-party portable terminal 1, items, such as "static state", "while moving", "while jogging", "while walking", and "being manually operated", are displayed.

The user selects the item of the desired motion condition from among the selection setting items displayed in a list on the display screen of the LCD 27. Then, the information regarding the item of the selected motion condition is sent to the communication motion condition setting section 23, where it is held, and is used as a determination condition as to whether or not the above-described data communication in the communication determination section 22 should be started with the other-party portable terminal.

Since the data communication of the portable terminal of this embodiment is communication via a phone call, the audio interface 26 is used to transmit and receive phone voice data to and from the system bus 10.

That is, the voice of the user making a phone call is collected by the microphone 28, and is supplied via the amplifier 29 to the audio interface 26, whereby it is converted into digital voice data. The digital voice data is transferred to the communication data encoder/decoder 15 via the system bus 10. The phone voice data that is received from the other-party portable terminal 1 and that is decoded by the communication data encoder/decoder 15 is returned to an analog voice signal via the audio interface 26, is supplied to the speaker 31 via the amplifier 30, and is acoustically reproduced.

Description of Operation of Portable Terminal of First Embodiment

Figure 3:
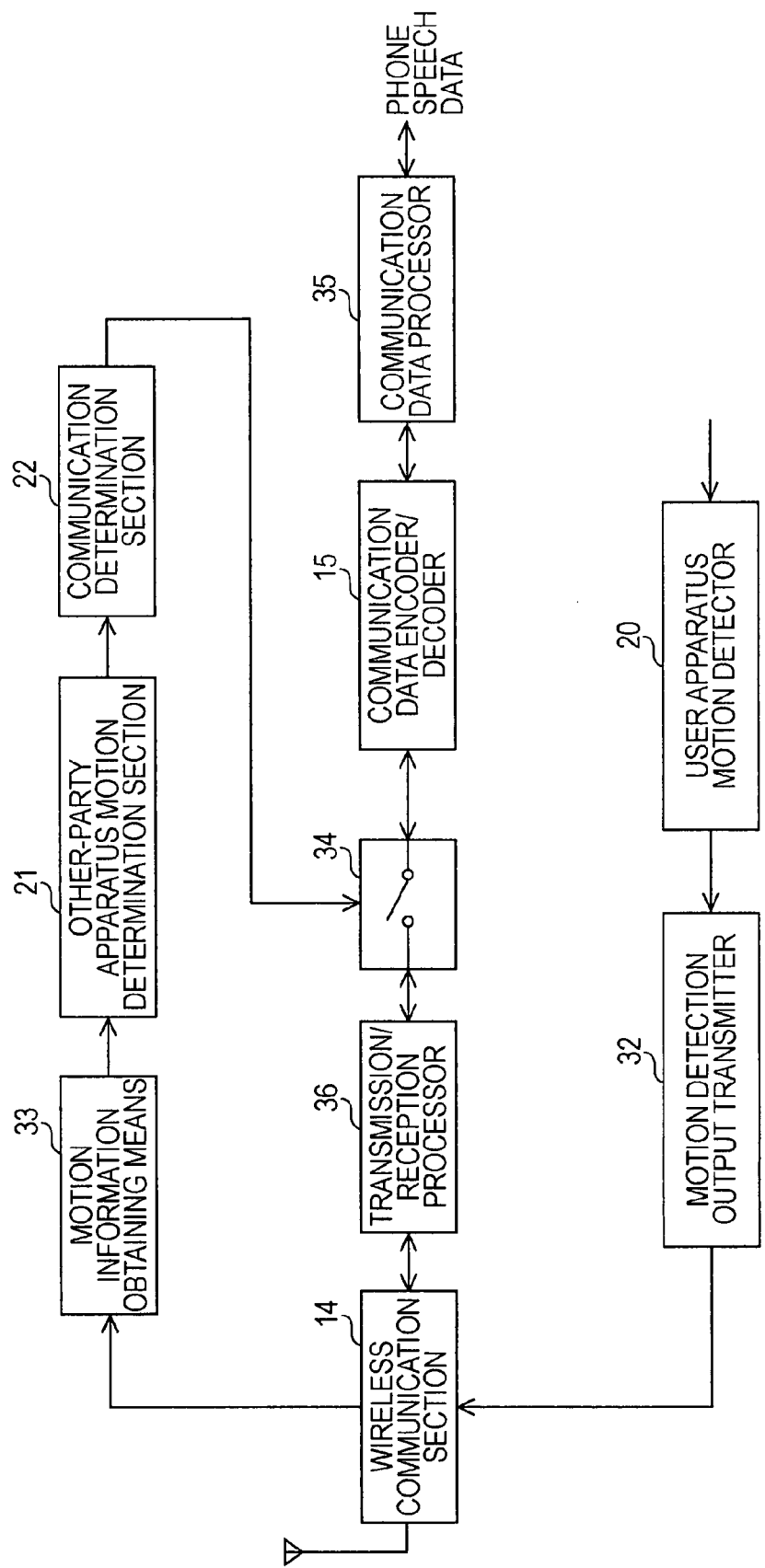
FIG. 3 is a function block diagram illustrating the operation of the portable terminal of the first embodiment.

FIG. 3 is a block diagram illustrating the flow of a processing operation describing the operation when data communication with an other-party portable terminal that is making a specific motion in the portable terminal 1 of the first embodiment. Some blocks of the block diagram are functions blocks and are parts configured by software processing performed by the CPU 11 in accordance with a program in the ROM 12.

In this embodiment, first, information regarding the motion of the user apparatus, which is detected by the user apparatus motion detector 20, is sent by broadcast and via the motion detection output transmission section 32 and via the wireless communication section 14. The motion detection output transmission section 32 includes processing of the communication data encoder/decoder 15 and processing of the packet decomposition/generation section 16. At this time, a communication address of the wireless transmission section 14 of the user apparatus is contained as a sending source address in a broadcast packet to be sent.

Furthermore, the information regarding the motion, which is sent as a broadcast packet from an other-party portable terminal 1, the information being received by the wireless communication section 14, is obtained by the motion information obtaining means 33 and is supplied to the other-party apparatus motion determination section 21. In the other-party apparatus motion determination section 21, as described above, the motion of the other-party portable terminal is determined on the basis of the received information regarding the motion from the other-party portable terminal. Then, in the communication determination section 22 at a subsequent stage, the motion of the other-party portable terminal, which is determined by the other-party apparatus motion determination section 21, is compared with a motion condition of the other-party portable terminal with which data communication should be performed, which is held by the communication motion condition setting section 23 whose illustration is omitted in FIG. 3.

Then, when it is determined by the communication determination section 22 that the motion of the other-party portable terminal does not satisfy the motion condition of the other-party portable terminal with which data communication should be performed, the communication determination section 22 controls the switch means 34 so as to be maintained off, and data communication with the other-party portable terminal does not start.

On the other hand, when it is determined by the communication determination section 22 that the motion of the other-party portable terminal satisfies the motion condition of the other-party portable terminal with which data communication should be performed, the communication determination section 22 performs control so that the switch means 34 is turned on and data communication with the other-party portable terminal starts. At this point, the switch means 34 corresponds to the permission/non-permission control of data communication by the CPU 11.

When control is performed so that data communication starts, in this example, communication of phone voice data is performed with the other-party portable terminal. That is, a communication request is sent to the communication address of the other-party portable terminal 1, which is contained in the broadcast packet received from the other-party portable terminal 1, and waiting for a response from the other party is done. Then, a communication channel for communication data is generated, and communication is started.

In this example, since communication data is phone call voice, the following operation is performed. That is, the transmitted voice signal from the microphone 28 is supplied via the communication data processor 35 and via the communication data encoder/decoder 15 and the switch means 34 to the transmission and reception processor 36, whereby the signal is divided into packets. They are then sent to the other-party portable terminal via the wireless communication section 14 from the transmission and reception processor 36. The packets of the received phone voice data are received by the wireless communication section 14 and supplied to the transmission and reception processor 36. In the transmission and reception processor 36, processing such as packet decomposition is performed to extract received phone voice data. The received phone voice data is decoded by the communication data encoder/decoder 15 via the switch means 34, is supplied as a received phone voice signal via the communication data processor 3 to the speaker 315, whereby it is output.

Figure 4:
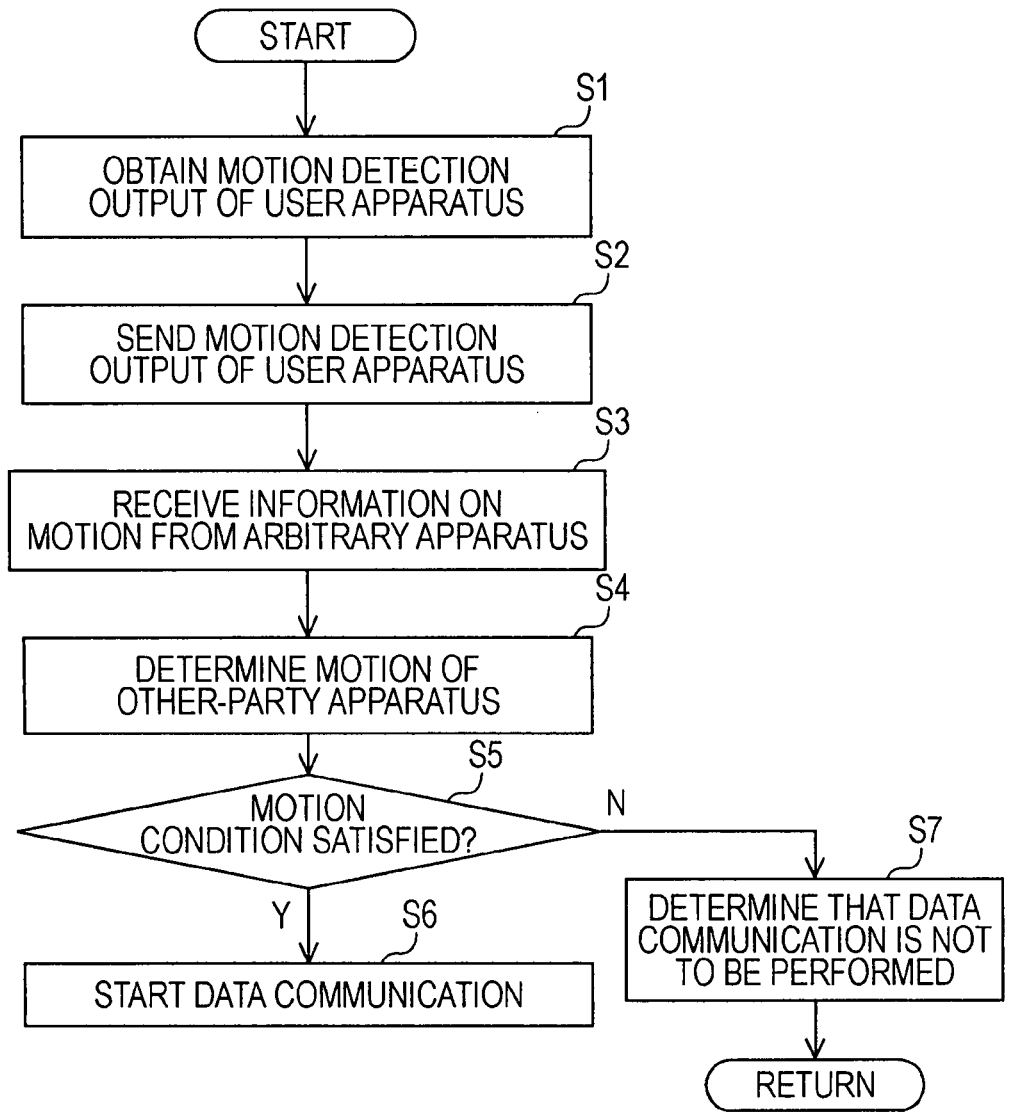
FIG. 4 is a flowchart illustrating the operation of the portable terminal of the first embodiment.

The flowchart of the processing operation in the portable terminal 1 is shown in FIG. 4. The processing of each step of the flowchart in FIG. 4 is performed by the CPU 11 in accordance with a program in the ROM 12 by using the RAM 13 as a work area.

That is, in this embodiment, the CPU 11 obtains the motion detection output of the user apparatus, which is detected by the user apparatus motion detector 20 (step S1), and sends, by broadcast, the obtained motion detection output of the user apparatus as information regarding the motion of the user apparatus to an other-party portable terminal 1 (step S2). The motion detection output that is sent at this time is used to make a determination by the other-party apparatus motion determination section 21 of the other-party portable terminal 1, and contains the communication address information of the user apparatus.

Next, the CPU 11 receives information regarding the motion from an other-party portable terminal via the wireless communication section 14 (step S3), and allows the other-party apparatus motion determination section 21 to make a determination as to the motion of the other-party portable terminal that sent the information regarding the motion (step S4).

Then, the CPU 11 allows the communication determination section 22 to determine whether or not the motion of the other-party portable terminal of the determination result satisfies the motion condition of the communication party apparatus, which is registered in the communication motion condition setting section 23 (step S5). When it is determined that the motion satisfies the motion condition, the CPU 11 sends a communication request (containing the communication address of the user apparatus as a transmission source address) to the other-party apparatus by using the communication address of the other-party apparatus, which is contained in the broadcast packet received from the other-party apparatus, and waits for a response corresponding to the communication request to be received. Then, a communication channel is formed with the other-party apparatus, and data communication is started (step S6).

When it is determined in step S5 that the motion condition is not satisfied, the CPU 11 determines that data communication is not to be performed with the other-party apparatus (step S7) and exits from the processing routine.

Figure 5:
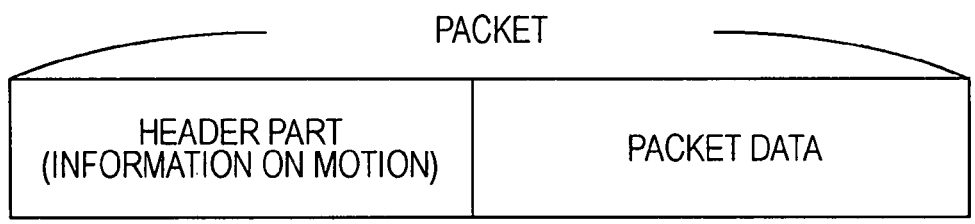
FIG. 5 shows an example of a packet transmitted and received between a portable terminal and another portable terminal in the first embodiment.

An example of the structure of a packet to be sent to an other-party portable terminal by broadcast is shown in FIG. 5.

In the example of FIG. 5, information regarding motion is contained in a packet header. In the first embodiment, "static state", "while moving", "while jogging", "while walking", "being manually operated", or the like is transmitted as information regarding motion. The information contained in the packet header includes, for example, 3-bit information that identifies "static state", "while moving", "while jogging", "while walking", "being manually operated", or the like.

By assuming the portable terminal 1B in the case (1) as a terminal being moved and by assuming the portable terminal 1C in the case (2) (may include the case (3)) as a terminal whose position is not moved, the presence or absence of the movement (the presence or absence of the motion can also be used) may also be regarded as a specific motion of the other-party terminal with which data communication is desired to be performed. In that case, only by detecting the presence or absence of the motion, it is possible to determine whether or not the terminal is an other-party terminal with which data communication should be started. Information regarding the motion of the terminal, which is transmitted by broadcast from the terminal, can also be regarded as information on the presence or absence of the movement or information on the presence or absence of a motion.

In that case, information regarding motion, which is contained in the packet header, may be—bit information indicating whether the apparatus is in a static or moving state.

Modification of First Embodiment

In the above-described embodiment, as a sensor for detecting the motion of the user apparatus, a gyro, an acceleration sensor, a vibration sensor, and the like are used. Alternatively, for example, a GPS (Global Positioning System) receiver section may be connected to the system bus 10, so that the motion of the user apparatus is detected on the basis of the position information obtained from the GPS receiver section. In addition, the position information obtained from the GPS receiver section may be combined with outputs of the gyro, the acceleration sensor, the vibration sensor, and the like in order to detect the motion of the user apparatus.

In the above description, a predetermined motion pattern is set in the communication motion condition setting section 23. Alternatively, a static state may be set as a communication motion condition, or a motion of a magnitude larger than a predetermined value or a motion of a magnitude smaller than a predetermined value may be set as a communication motion condition.

Second Embodiment

In the first embodiment, one or more sensors are provided, the user apparatus motion detector 20 detects the motion of the user apparatus by using the output of the sensor, and the detected motion detection information of the user apparatus is transmitted by broadcast to an other-party apparatus.

Figure 6:
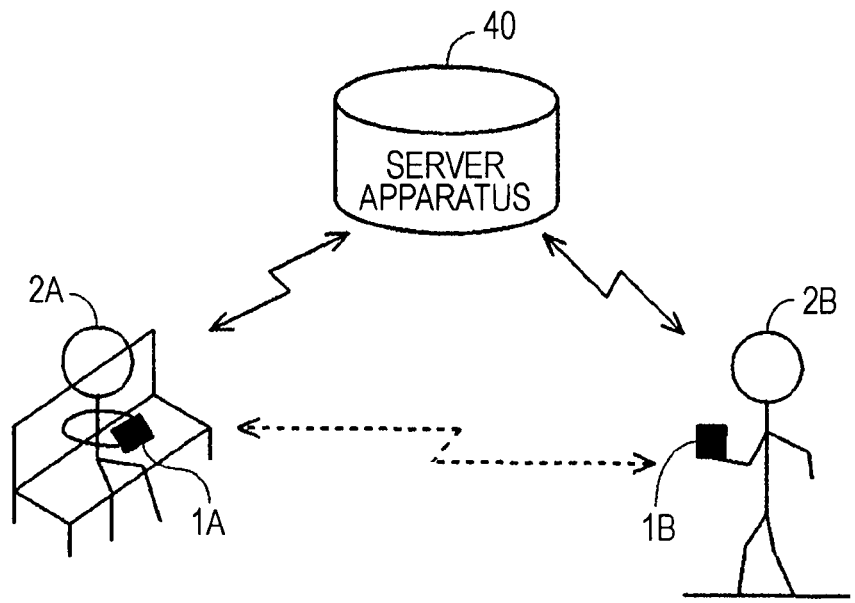
FIG. 6 illustrates data communication between portable terminals in a second embodiment.

In comparison, in a second embodiment, elements for detecting the motion of the user apparatus, that is, the gyro 17, the acceleration sensor 18, the vibration sensor 19, and the user apparatus motion detector 20, are not provided in the portable terminal 1 as an embodiment of the data communication apparatus. Instead, as shown in FIG. 6, a server apparatus 40 for remotely monitoring each of portable terminals 1 is provided. The server apparatus 40 detects and determines the motion of each portable terminal, and information on the motion of each portable terminal 1 is sent to each of the portable terminals 1 (1A, 1B) from the server apparatus 40. At this time, identification information of each portable terminal 1 and the communication address thereof are attached to the information on the motion, which is sent from the server apparatus 40.

Each portable terminal 1 (1A, 1B) receives information on the motion of another portable terminal from the server apparatus 40. In the same manner as that described above, the communication determination section 22 determines whether or not there is an other-party portable terminal that satisfies the communication motion condition. When an other-party portable terminal that satisfies the communication motion condition is detected, a communication request containing the communication address is sent to the other-party portable terminal, and data communication is started.

Figure 7:
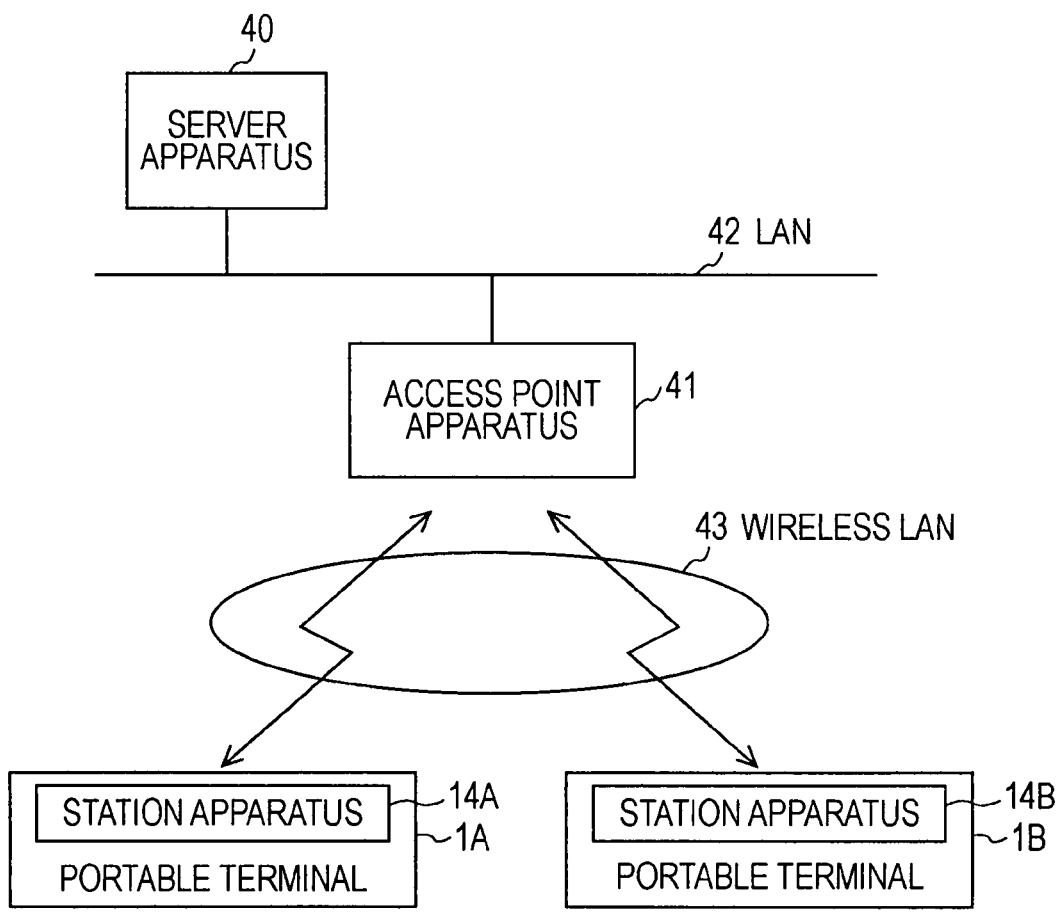
FIG. 7 shows an example of the configuration of a communication system including the portable terminals of the second embodiment.

FIG. 7 is a block diagram showing an example of the configuration of a system when a wireless LAN of the IEEE 802.11 standard is used as a communication infrastructure of the second embodiment.

The server apparatus 40 is connected to an access point apparatus 41 via a wired LAN 42. In this example, the server apparatus 40 has a function of managing wireless communication in a wireless LAN 43. Then, the access point apparatus 41 is wirelessly connected to each of the portable terminals 1A and 1B via the wireless LAN 43. For the wireless communication sections of the portable terminals 1A and 1B in the second embodiment, station apparatus 14A and 14B that are wirelessly connected to the access point apparatus 41 are used, respectively.

In the wireless LAN of this example, when each of the portable terminals 1A and 1B enters a communication area of the wireless LAN 43, the portable terminals 1A and 1B are registered in the access point apparatus 41. At this time, in this example, each of the portable terminals 1A and 1B sends the position information regarding the location thereof, which is measured by, for example, the GPS receiver, to the server apparatus 40 via the access point apparatus 41.

A beacon is sent at fixed periods from the access point apparatus 41. Then, each of the portable terminals 1A and 1B receives the beacon by intermittent reception, and sends a reception response to the server apparatus 40 via the access point apparatus 41 in order to inform the server apparatus 40 that the portable terminal is within the area covered by the wireless LAN 43. In this embodiment, a packet for the reception response, the packet containing the position information regarding the location obtained by the GPS receiver, is sent.

On the basis of the position information of the portable terminal 1, contained in the packet during registration and in a response packet for the beacon, the server apparatus 40 detects the motion of each portable terminal 1, and holds the information on the motion. Then, in the manner described above, the server apparatus 40 transmits the information (for example, information for identifying "static state", "while moving", "while jogging", "while walking", and the like) regarding the motion of each portable terminal 1 within the area covered by the wireless LAN 43, which is detected by a remote monitor, with the information being contained in the beacon, to all the portable terminals 1 within the area covered by the wireless LAN 43.

Each portable terminal 1 receives a beacon by intermittent reception, extracts the motion information of the other-party portable terminal, which is contained in the beacon, and makes a determination as to the motion. In the same manner as that described above, each portable terminal 1 determines whether or not there is an other-party portable terminal that is making a motion satisfying the communication motion condition, and starts communication if there is such an other-party portable terminal.

Example of Configuration of Hardware of Portable Terminal of Second Embodiment

Figure 8:
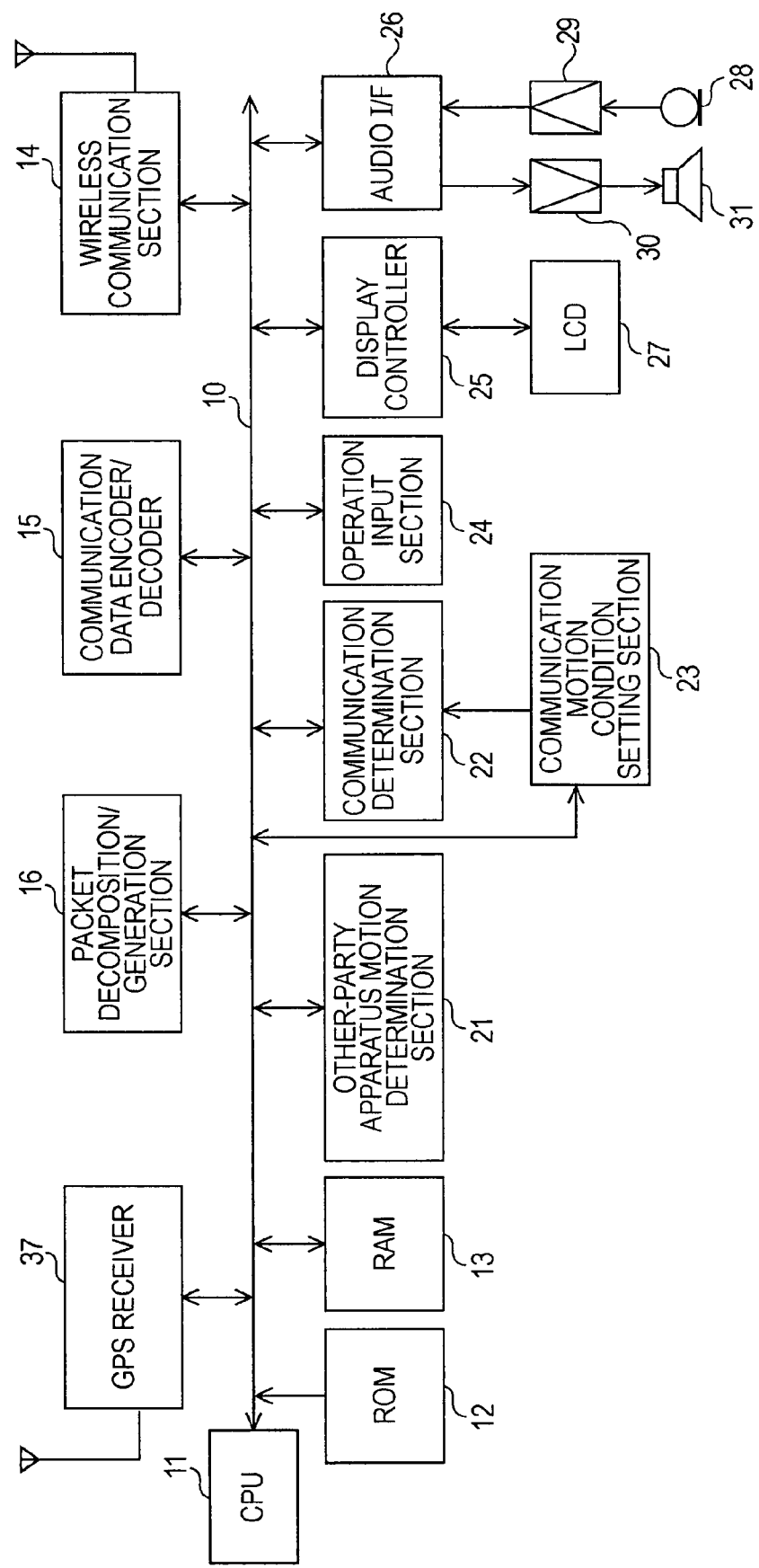
FIG. 8 shows an example of the configuration of the hardware of a portable terminal of the second embodiment.

FIG. 8 is a block diagram showing an example of the configuration of the hardware of the portable terminal 1 in the second embodiment. In the block diagram of FIG. 8, the same units as those units in the example of the configuration of the portable terminal 1 in the first embodiment shown in FIG. 1 described above are designated with the same reference numerals.

In the portable terminal 1 of the second embodiment shown in FIG. 8, as described above, the gyro 17, the acceleration sensor 18, the vibration sensor 19, and the user apparatus motion detector 20 in FIG. 1 are not provided. Instead, in the portable terminal 1 of the example of FIG. 8, a GPS receiver section 37 is provided. The wireless communication section 14 is configured as a station apparatus that is wirelessly connected to the access point apparatus 41 in the IEEE 802.11 standard of this example. The remaining configuration is completely the same as in the first embodiment in terms of hardware.

The GPS receiver section 37 measures the position of the user apparatus. The position information of the measurement result, as described above, is supplied to the server apparatus 40 in such a manner that it is contained in a packet for a response to the received beacon and in a packet during registration in the access point apparatus 41.

Figure 9:
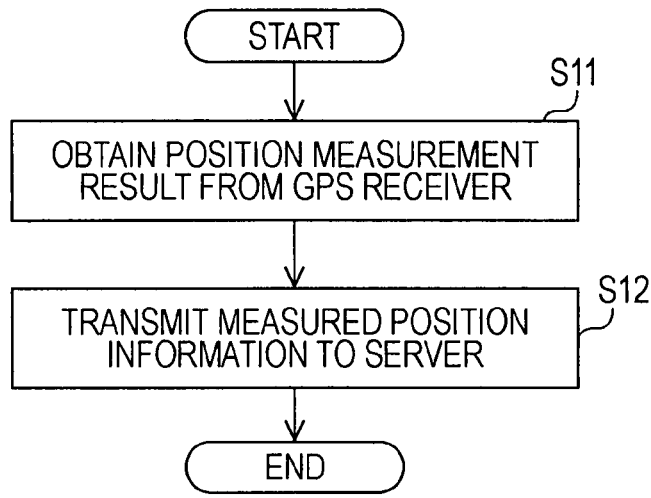
FIG. 9 is a flowchart illustrating the operation of the portable terminal of the second embodiment.

Description of Processing Operation of Portable Terminal and Server Apparatus of Second Embodiment FIG. 9 is a flowchart illustrating a processing operation for the portable terminal 1 to send position information measured by the GPS receiver section 37 to the server apparatus 40.

At first, the CPU 11 obtains the position information of the user apparatus, which is measured by the GPS receiver section 37 (step S11). Then, in this example, when the user apparatus is registered in the access point apparatus 41 and when a response is made to a beacon from the access point apparatus 41, the CPU 11 sends a packet containing the position information of the user apparatus obtained in step S11 and the communication address of the user apparatus to the access point apparatus 41.

The access point apparatus 41 sends the packet sent from the portable terminal 1 to the server apparatus 40 (step S12). The server apparatus 40 detects the motion of the portable terminal from the position information of the portable terminal, which is contained in the received packet from the portable terminal 1. Then, the server apparatus 40 sends the information on the detected motion for all the portable terminals that are managed as terminals within the area covered by the wireless LAN 43, with the information being contained in a beacon, to all the portable terminals that are managed as terminals within the area covered by the wireless LAN 43 via the access point apparatus 41.

Figure 10:
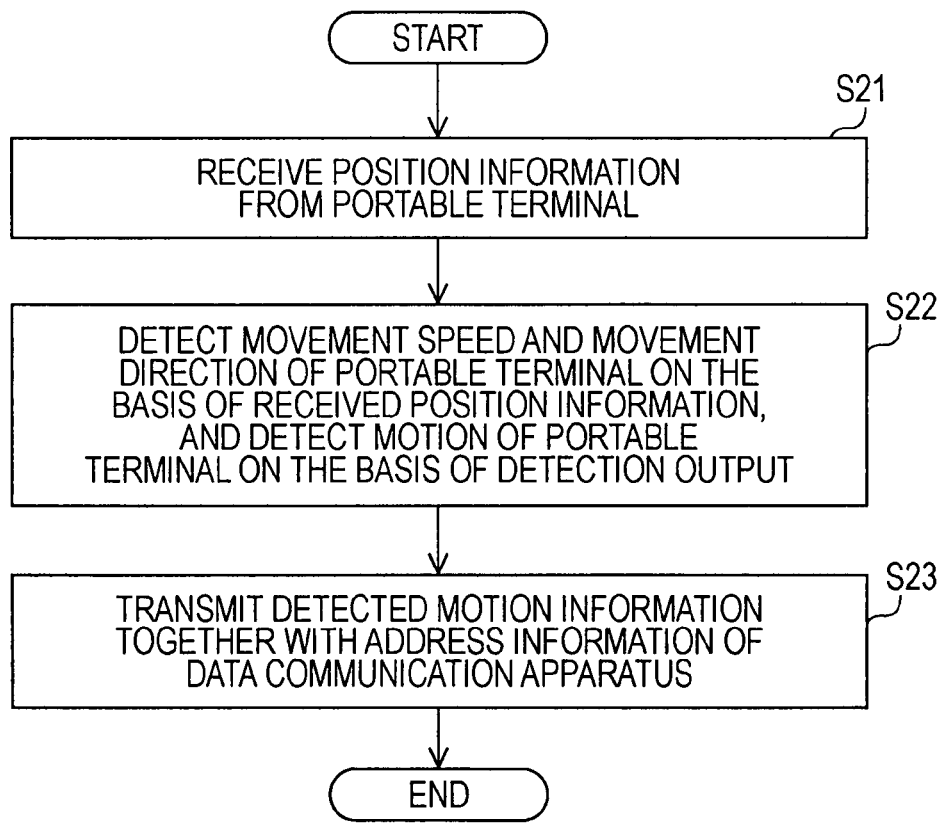
FIG. 10 is a flowchart illustrating the operation of a server apparatus interposed among portable terminals of the second embodiment.

A flowchart of an example of a processing operation in the server apparatus 40 at this time is shown in FIG. 10. That is, the server apparatus 40 receives the position information from the portable terminal 1 covered in the wireless LAN 43 via the access point apparatus 41 (step S21).

Next, on the basis of the received position information of the portable terminal, the server apparatus 40 detects the movement speed, the movement direction, and the like of the portable terminal, and on the basis of the detected information, the server apparatus 40 makes a determination as to what kind of motion the portable terminal is making (the above-described "static state", "while moving", "while jogging", "while walking", or the like) (step S22). Then, the server apparatus 40 sends the information on the determined motion (identification information on the above-described motion type, and the like) to all the portable terminals covered by the wireless LAN 43 via the access point apparatus 41 in such a manner that the information corresponds to the address information of the portable terminal and is contained in, for example, a beacon (step S23).

Figure 11:
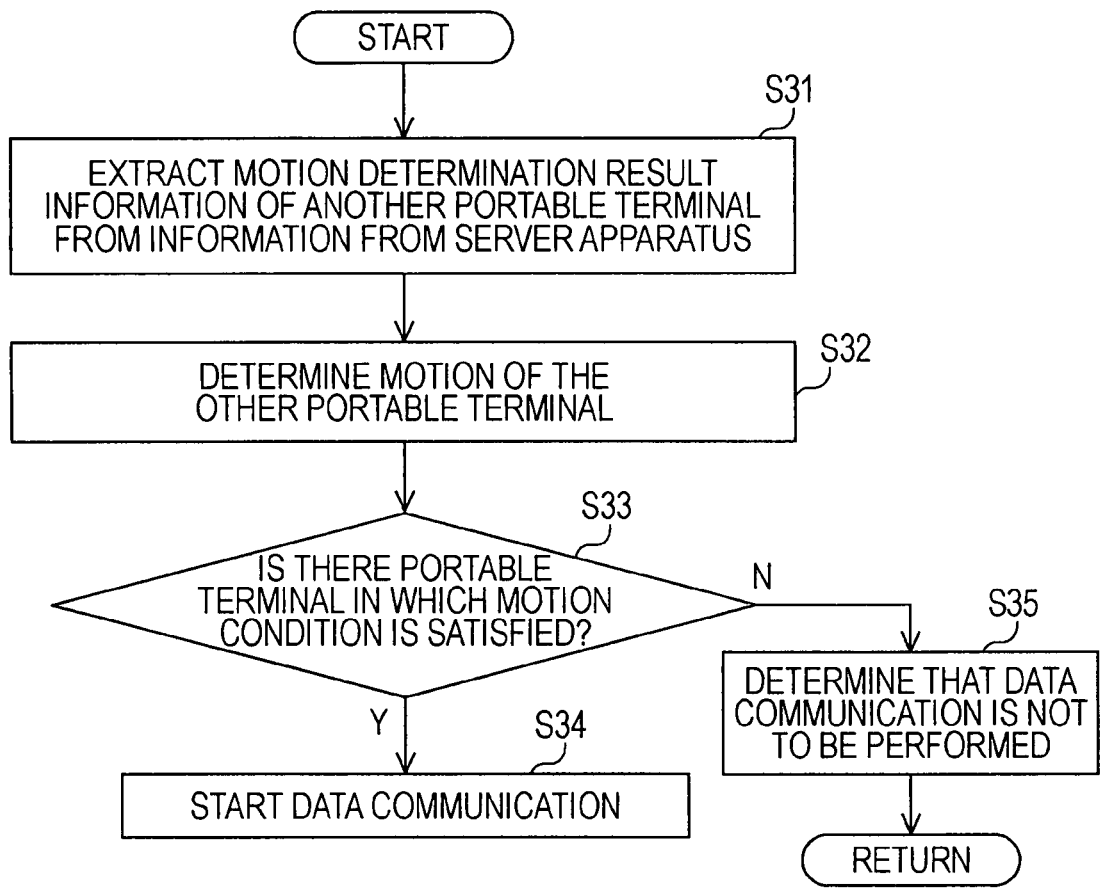
FIG. 11 is a flowchart illustrating a processing operation when a portable terminal of the second embodiment receives data from the server apparatus.

Next, an example of a processing operation in each portable terminal 1 receiving determination result information on the motion of all the portable terminals covered by wireless LAN 43 at that point in time, the information being sent from the server apparatus 40, is shown in the flowchart of FIG. 11.

That is, the CPU 11 of the portable terminal 1 extracts motion determination result information of another portable terminal from the information received from the server apparatus 40 (step S31), and determines the motion of the other portable terminal by using the extracted motion determination result (step S32). Next, the CPU 11 compares the determined motion of the other portable terminal with the motion condition that is selected and set by a user, which is stored in the communication motion condition setting section 23, and determines whether or not there is a portable terminal in which the motion condition is satisfied (step S33).

When it is determined in step S33 that there is a portable terminal in which the motion condition is satisfied, the CPU 11 extracts the communication address information in which the motion condition is satisfied from the information received from the server apparatus 40, and sends a communication request via the access point apparatus 41 to the portable terminal of the communication address information. Then, when the CPU 11 receives a response to the communication request from the portable terminal of the destination via the access point apparatus 41, the CPU 11 forms a communication channel between them, and starts data communication (step S34).

When it is determined in step S33 that a portable terminal in which the motion condition is satisfied does not exist, the CPU 11 determines that data communication is not to be performed (step S35) and exits from the processing routine.

Modification of Second Embodiment

Although, in the second embodiment, the motion of the portable terminal is determined from only the position information measured by the GPS receiver section, a gyro, an acceleration sensor, and a vibration sensor may be provided in a portable terminal, and sensor outputs therefrom may be sent to the server apparatus 40 in the same manner as in the first embodiment. In that case, it is possible for the server apparatus to more accurately make a determination as to the motion of each portable terminal. Also, in that case, the user apparatus motion detector 20 needs not to be provided.

When it is to be detected whether the portable terminal is in a static or moving state as the motion of the portable terminal, radio-wave intensity measurement means for measuring the intensity of radio waves when wireless connection is made to the station apparatus of the portable terminal can be provided in the access point apparatus 41, so that the radio-wave intensity measurement means detects whether each portable terminal is operating. In that case, it is not necessary to provide a GPS receiver section or the like in the portable terminal.

In the above-described example, the server apparatus is connected to the access point apparatus of the wireless LAN in compliance with the IEEE 802.11 standard. However, the server apparatus is not limited to such a case. For example, the portable terminal 1 may be a portable phone terminal, and the server apparatus may be provided in a base station of a portable telephone network.

In the above-described second embodiment, the motion of the portable terminal 1 is detected by the server apparatus. Alternatively, in the same manner as in the first embodiment, the portable terminal 1 may detect the motion of its own apparatus by means of its own apparatus and may send the detected determination result to another portable terminal via the server apparatus.

Third Embodiment

Figure 12:
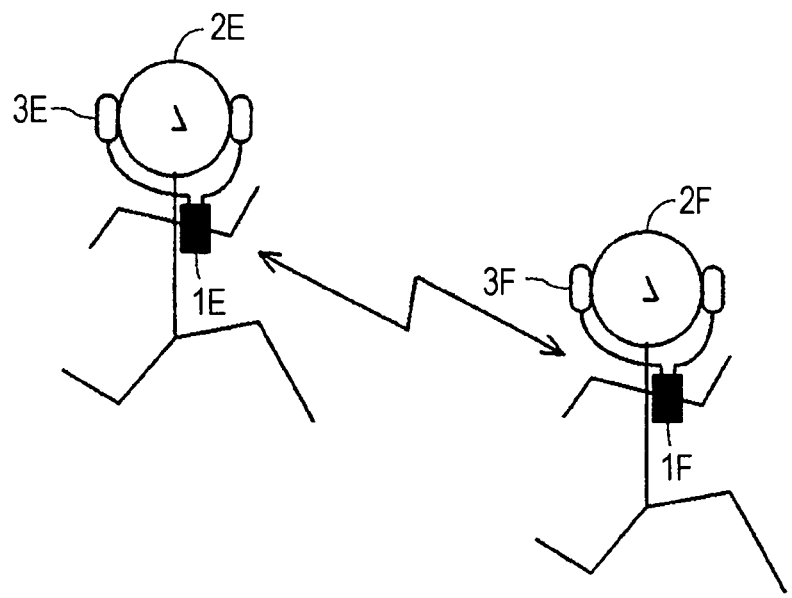
FIG. 12 illustrates a moving state in which portable terminals in a third embodiment starts data communication.

A third embodiment shows an example in which, for example, as shown in FIG. 12, data communication is performed between persons jogging or walking at substantially the same speed and in substantially the same direction, and music content stored in one of the portable terminals can be enjoyed in common.

In the third embodiment, each of portable terminals 1 (a portable terminal 1E of a user 2E, a portable terminal 1F of a user 2F) has functions of reproducing data of music content stored in a storage medium and supplying it to sound reproduction means, such as a headset 3 (a headset 3E of the portable terminal 1E of the user 2E, a headset 3F of the portable terminal 1F of the user 2F), whereby the music content is reproduced.

Each of the portable terminals 1 has functions of transmitting data of music content stored in the storage medium of the user apparatus to another portable terminal, receiving data of music content sent from another portable terminal, decoding it, and supplying the decoded music information to sound reproduction means, such as the headset 3, whereby the music content is reproduced.

Similarly to the first embodiment, the portable terminal of the third embodiment detects and determines the motion information by the user apparatus, and sends determination output result to another portable terminal via the wireless communication section 14.

The state of FIG. 12 is a state in which two users 2E and 2F having the portable terminal of the third embodiment and jogging at substantially the same speed and in substantially the same direction perform data communication between them, and enjoy common music content at the same time.

Example of Configuration of Hardware of Portable Terminal of Third Embodiment

Figure 13:
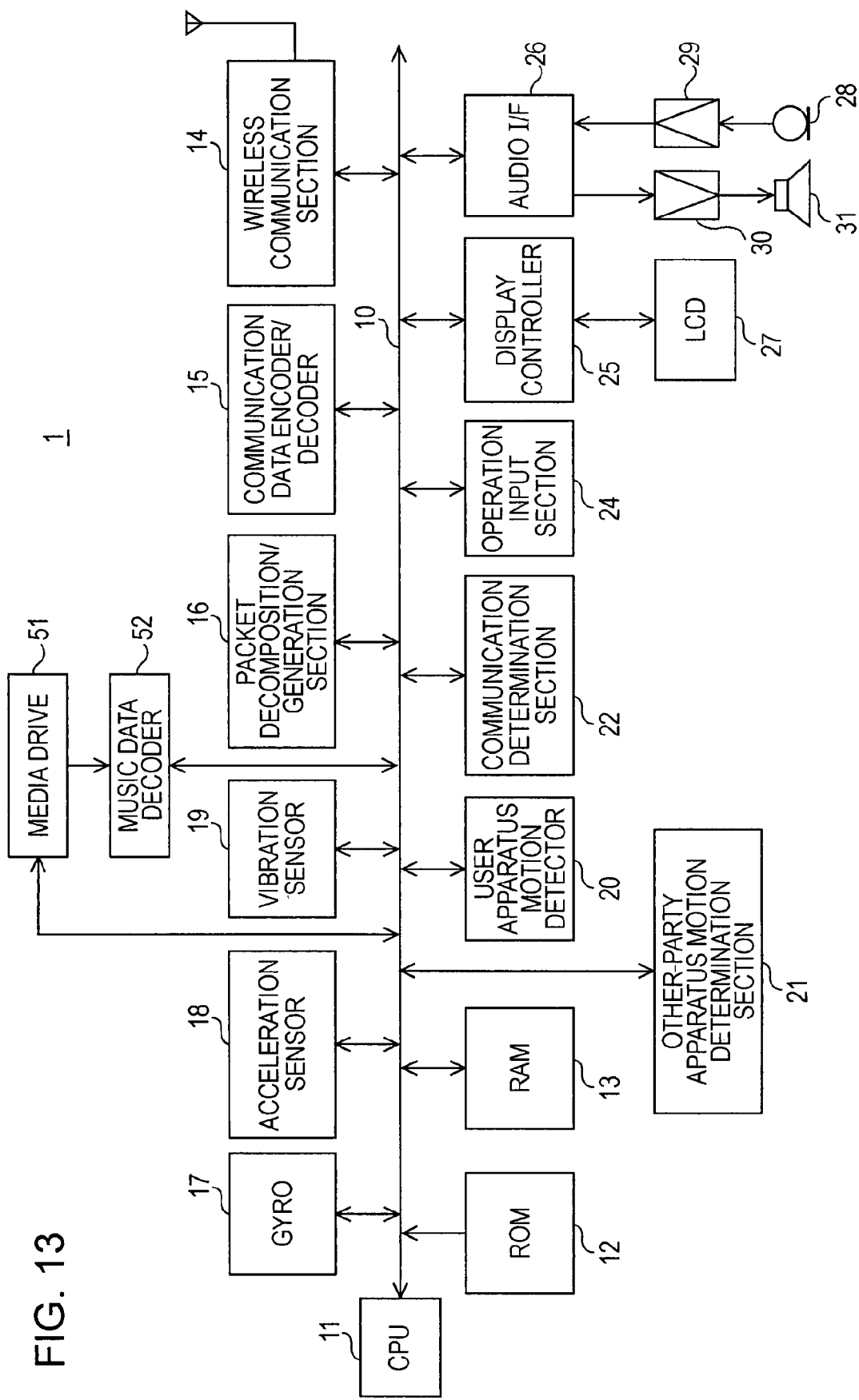
FIG. 13 shows an example of the configuration of the hardware of a portable terminal of the third embodiment.

FIG. 13 is a block diagram showing an example of the configuration of the hardware of a portable terminal 1 in the second embodiment. In the block diagram of FIG. 13, the same units as those units in the example of the configuration of the portable terminal 1 in the first embodiment shown in FIG. 1 described above are designated with the same reference numerals.

In the portable terminal 1 of the third embodiment, a media drive 51 to which a storage medium having stored thereon music content is removably loaded is provided in such a manner as to be connected to a system bus 10. The music data from the media drive 51 is connected to the system bus 10 via a music data decoder 52.

In this example, a speaker 31 is configured as a headset, and a microphone 28 is provided in such a manner as to be fixed to the headset.

When an instruction is made so that a medium is reproduced via an operation input section 24, the media drive 51 reads the music data of the music content that is instructed to be reproduced by the user from the loaded storage medium and sends it to the music data decoder 52. The music data decoder 52 decodes the music data received from the media drive 51, converts it into a digital audio signal, and transfers it to an audio interface 26. The audio interface 26 converts the received digital audio signal into an analog audio signal, and supplies it to the speaker (headset) 31 via the amplifier 30. As a result, the music content is acoustically reproduced and is provided to the user.

In the third embodiment, as will be described later, when it is determined that the communication motion condition is satisfied and a wireless communication channel is formed with an other-party portable terminal, a request for obtaining music data is sent from the user portable terminal to the other-party portable terminal. The other-party terminal receiving the request for obtaining music data divides the music data being currently reproduced into packets and sends them to the portable terminal that has made the request.

The portable terminal that has made the request receives the packets of the music data, decodes them, converts the decoded output into an analog voice signal by the audio interface 26, and supplies them via the amplifier 30 to the speaker 31, whereby the music data is acoustically reproduced. As a result, when, for example, friends are jogging, the user can listen to music content stored on the storage medium of one of the portable terminals simply by only moving in substantially the same direction at substantially the same speed without performing any operation.

In the portable terminal of the third embodiment, conversation voice collected via the microphone 28 can be data-communicated in such a manner as to be superimposed on the reproduced voice of the music content also during reproduction of the music content. At this time, when, for example, a conversation button of the operation input section 24 is operated by the user, music data from a music data decoder 52 is muted, or the sound volume of only the music data is decreased, so that the conversation voice can easily be listened to.

In the third embodiment, the user apparatus motion detector 20 is configured to detect the movement speed and the movement direction of the user apparatus by using the gyro 17 and the acceleration sensor 18. Also, the information on the movement speed and the movement direction detected by the user apparatus motion detector 20 is sent, as information on the motion of the user apparatus, in the form of broadcast packets to another portable terminal.

Figure 14:
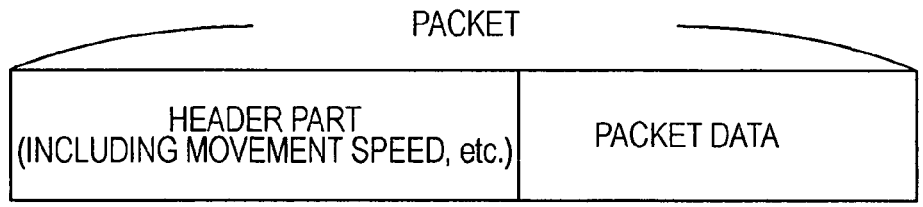
FIG. 14 shows an example of a packet transmitted and received between a portable terminal and another portable terminal in the third embodiment.

FIG. 14 shows an example of the structure of a packet to be sent at this time. That is, in this example, a packet is sent in such a manner that information on the movement speed and the movement direction of the user apparatus is contained in the packet header. The fact that the communication address information of the user apparatus is contained as the address information on the transmission source in the packet header is the same as in the above-described embodiments.

The other-party apparatus motion determination section 21 in the third embodiment extracts information on the movement speed and the movement direction, which is received from another portable terminal, makes a determination as to in which direction and at which speed the other portable terminal is moving, and supplies the determination result to the communication determination section 22. If the information on the movement speed and the movement direction, which is received from the other portable terminal, is information that can be used by the communication determination section 22 as is, the other-party apparatus motion determination section 21 may be omitted.

In the third embodiment, since the communication motion condition is fixed as a condition in which motion that is moving in substantially the same direction at substantially the same speed as those of the user apparatus is detected, the communication motion condition setting section 23 is not provided. When another communication motion condition can be selected and set, the communication motion condition setting section 23 is provided and the communication motion condition is selected and set by the user in the same way as in the first embodiment.

The remaining configuration is the same as that of the portable terminal 1 of the first embodiment shown in FIG. 1.

Figure 15:
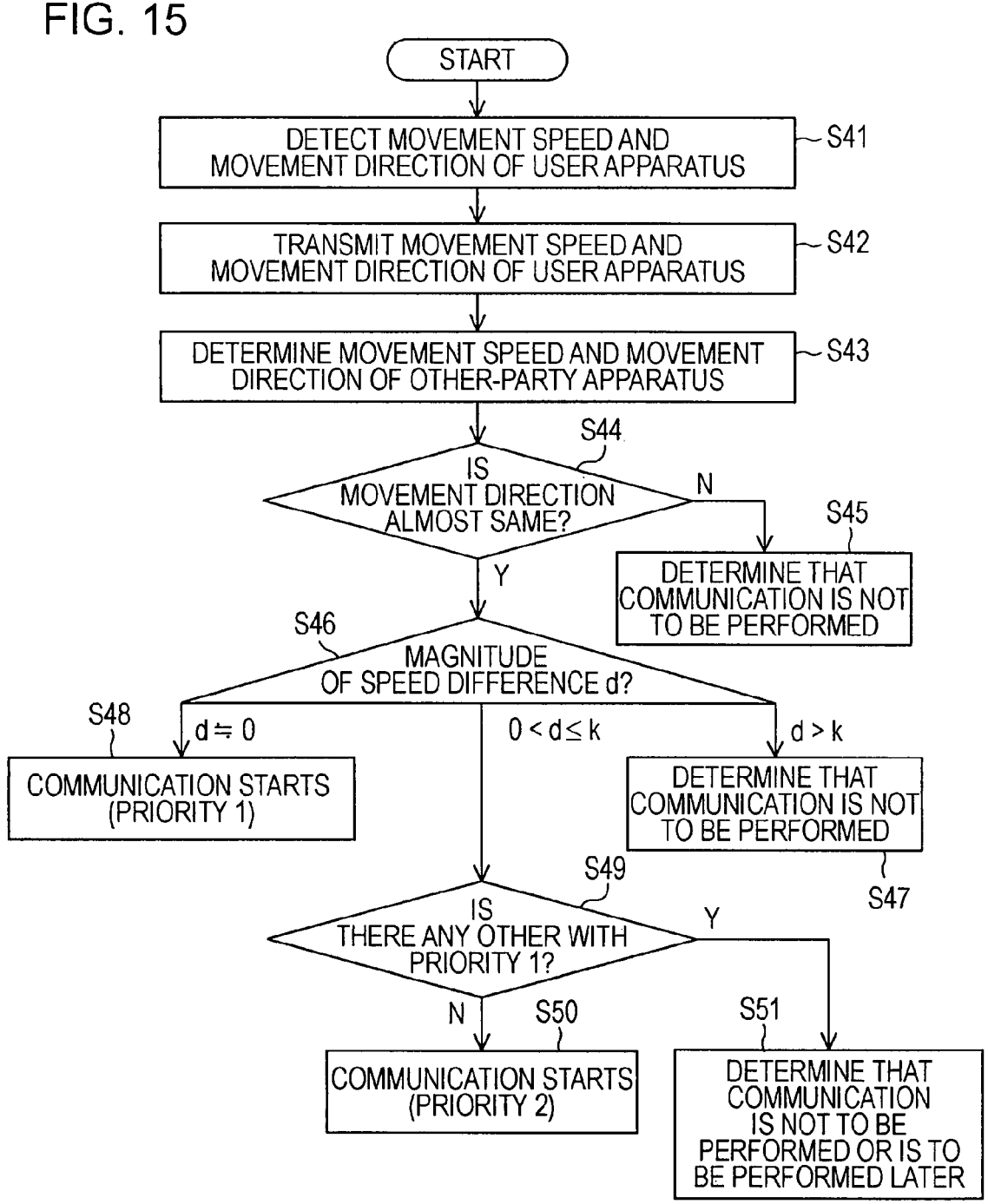
FIG. 15 is a flowchart illustrating the operation of a portable terminal of the third embodiment.

Description of Operation of Data Communication in Portable Terminal of Third Embodiment FIG. 15 is a flowchart illustrating an example of a data communication operation in the portable terminal 1 of the third embodiment.

At first, the CPU 11 detects the movement speed and the movement direction of the user apparatus by using sensor outputs of the gyro 17 and the acceleration sensor 18 (step S41). A GPS receiver section may be provided in the portable terminal 1, so that the information on the movement speed and the movement direction, which is measured by the GPS receiver section, is used. Next, the CPU 11 sends by broadcast a packet in which the detected information on the movement speed and the movement direction of the user apparatus is contained to another portable terminal (step S42).

Next, the CPU 11 extracts information on the movement speed and the movement direction of an arbitrary portable terminal from the broadcast packet received from the arbitrary portable terminal, and makes a determination as to the movement speed and the movement direction (step S43).

Next, on the basis of the determination in step S43, the CPU 11 determines whether or not the movement direction of the arbitrary portable terminal that has sent the information on the motion is substantially the same as that of the user apparatus (step S44).

When it is determined in step S44 that the movement direction of the user apparatus differs from the movement direction of an arbitrary portable terminal that has sent information on the motion and the difference is out of the condition range, the CPU 11 determines that communication is not to be performed with the arbitrary portable terminal (step S45) and exits from the processing routine.

When it is determined in step S44 that the movement direction of the user apparatus is substantially the same as the movement direction of the arbitrary portable terminal that has sent information on the motion and the difference is out of the condition range, the CPU 11 detects a difference d between the movement speed of the user apparatus and the movement speed of the arbitrary portable terminal that has sent the information on the motion, and makes a determination as to the magnitude of the detected difference d (step S46).

When it is determined in step S46 that the difference d is larger than a predetermined value k and is out of the condition range, even if the condition of the movement direction is satisfied, the CPU 11 determines that communication is not to be performed with the arbitrary portable terminal by considering that the condition of the movement speed is not satisfied (step S47), and exits from the processing routine.

When it is determined in step S46 that the difference is 0 or substantially 0, by considering that the condition for the priority to be a first place at which communication is started is satisfied, the CPU 11 extracts the communication address information of the portable terminal satisfying the motion condition from the received information, and sends a communication request to the portable terminal of the communication address information. Then, upon receiving a response to the communication request from the portable terminal of the destination, the CPU 11 forms a communication channel between them, so that data communication is started (step S48).

In this data communication, for example, a request for obtaining music data is sent to an other-party portable terminal. The music data sent from the other-party portable terminal is received and decoded, and is supplied via the audio interface 26 to the speaker 31, whereby the music data is acoustically reproduced.

When it is determined in step S46 that the difference is $0<d\leq k$, by considering that the condition for the priority to be a second place at which communication is started is satisfied, the CPU 11 determines whether or not there is another portable terminal in which the priority is the first place (step S49).

Then, when it is determined in step S49 that there is no other portable terminal in which the priority is the first place, the CPU 11 extracts the communication address information of the portable terminal satisfying the motion condition from the received information and sends a communication request to the portable terminal of the communication address information. Upon receiving a response to the communication request from the portable terminal of the destination, the CPU 11 forms a communication channel between them, so that data communication is started (step S50).

When it is determined in step S49 that there is another portable terminal in which the priority is the first place, the CPU 11 determines that communication is not to be performed with the arbitrary portable terminal or communication is to be performed later (step S51), and exits from the processing routine.

Fourth Embodiment

In the third embodiment, when persons hold portable terminals as an embodiment of the data communication apparatus, communication is started between the portable terminals when the persons are moving in substantially the same direction and at substantially the same speed. In comparison, the fourth embodiment shows a case in which the present invention is applied to a data communication apparatus mounted in an automobile.

The data communication apparatus of the fourth embodiment has a function of reproducing music content stored on a storage medium in the same manner as in the third embodiment, and also can start data communication when an automobile is moving in substantially the same direction and at substantially the same speed, obtains music content that is not possessed by the data communication apparatus of the automobile thereof from the data communication apparatus of another automobile, and can reproduce the music content in the same manner as in the third embodiment. Therefore, there is an advantage in that the same music content can be listened to among companions touring, for example, while a plurality of automobiles are touring in line.

Figure 16:
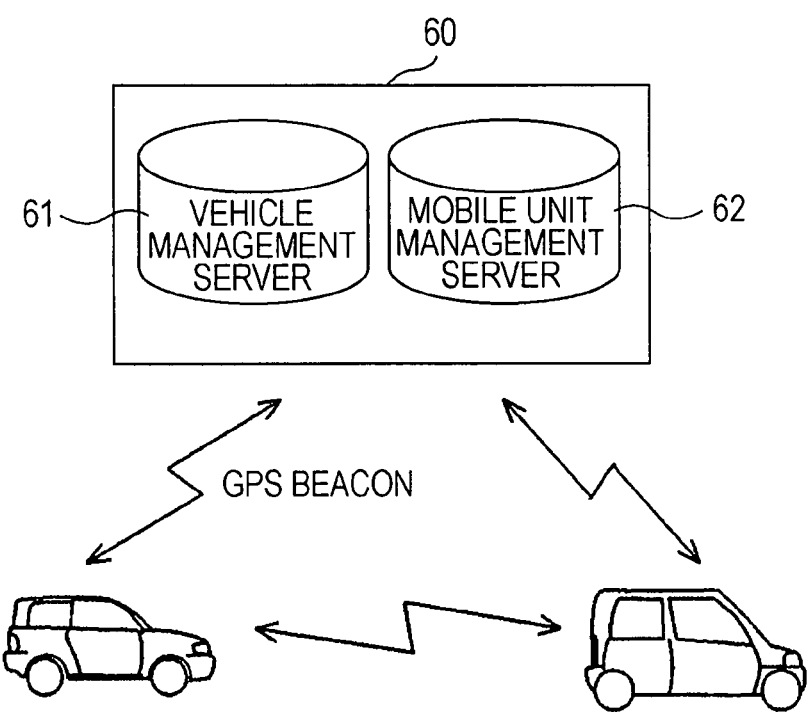
FIG. 16 illustrates a moving state in which data communication apparatuses in a fourth embodiment starts data communication.

The data communication apparatus 4 of the fourth embodiment, as shown in FIG. 16, sends the motion information on the other-party apparatus to another portable terminal via a server apparatus 60. The server apparatus 60 includes a vehicle management server 61 for database-managing automobiles, and a mobile-unit management server 62 for managing the current position and motion of each automobile managed by the vehicle management server 61.

Upon receiving information (the movement speed and the movement direction, position information by a GPS) on motion from the data communication apparatus 4 of the fourth embodiment, which is mounted in each automobile, the mobile-unit management server 62 makes a determination as to the motion of each automobile on the basis of the information on the motion. Then, the mobile-unit management server 62 sends information (the movement direction, the movement speed, etc.) on the determined motion of each automobile together with motion determination output to each automobile.

Figure 17:
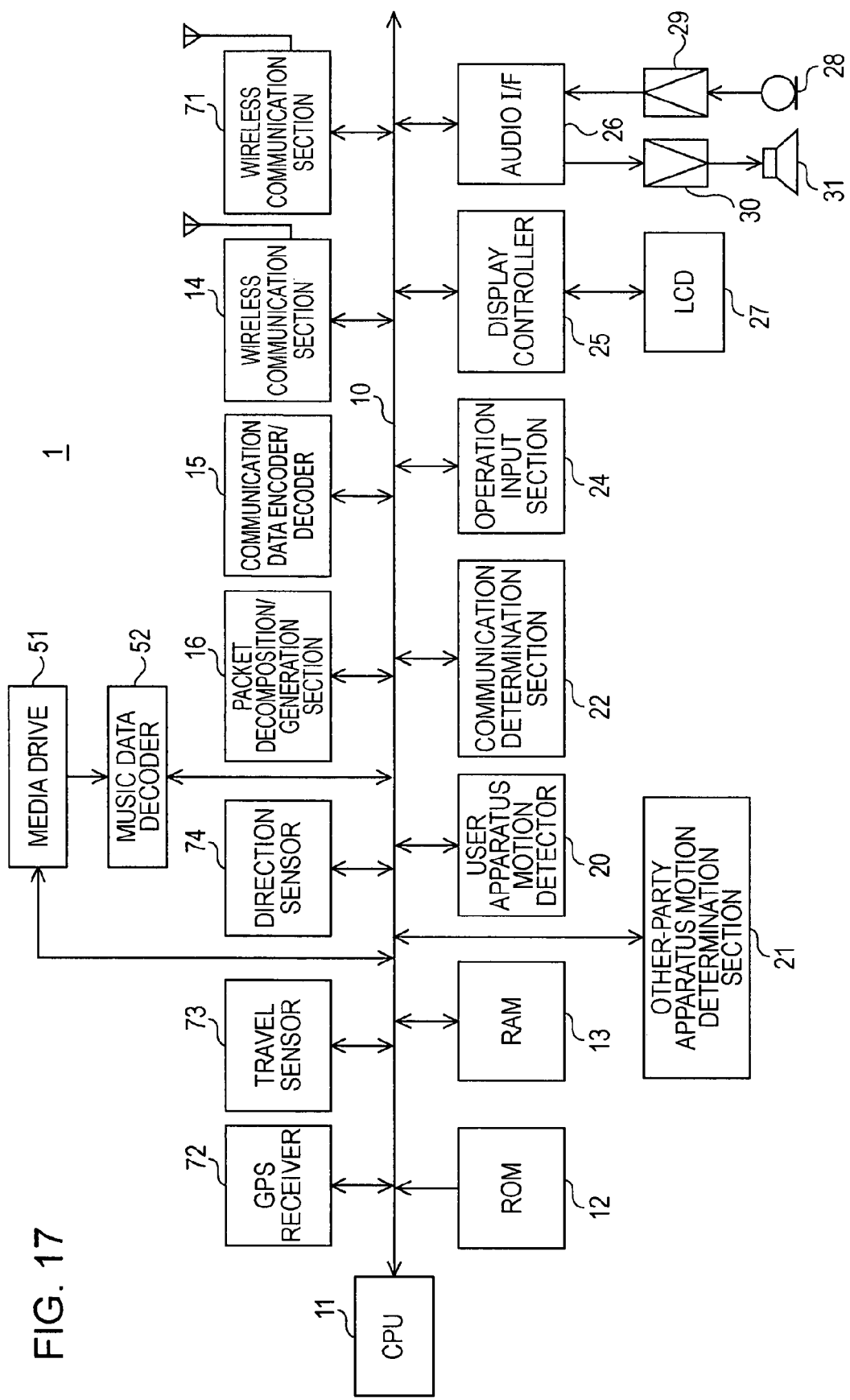
FIG. 17 shows an example of the configuration of the hardware of a data communication apparatus of the fourth embodiment.

Data communication among data communication apparatuses 4 mounted in automobiles is performed by short-distance communication by using the wireless communication section 14 in the same way as in the first embodiment and the like. For this reason, in the data communication apparatus 4 of the fourth embodiment, as shown in FIG. 17, in addition to the wireless communication section 14, a wireless communication section 71 for communicating with the server apparatus 60 is provided.

The data communication apparatus 4 of the fourth embodiment is configured in such a manner that a GPS receiver section 72, a travel sensor 73, and a direction sensor 74 are connected to the system bus 10. The remaining configuration is the same as that of the portable terminal 1 of the third embodiment.

Fifth Embodiment

In the third and fourth embodiments, when the user apparatus and an apparatus serving as a communication party exhibit a similar movement pattern, data communication is performed. In a fifth embodiment, it is determined whether or not data communication should be performed in accordance with the movement pattern of the apparatus serving as a communication party regardless of the motion of the user apparatus. In the fifth embodiment, by considering only the movement speed, data communication is performed with a terminal that moves at a predetermined movement speed.

The data communication apparatus of the fifth embodiment is applied to a portable terminal, and the hardware configuration thereof can be set to be the same as in the third or fourth embodiment. Accordingly, the description of the details thereof is omitted. However, in the fifth embodiment, the direction sensor 74 needs not to be provided.

Figure 18:
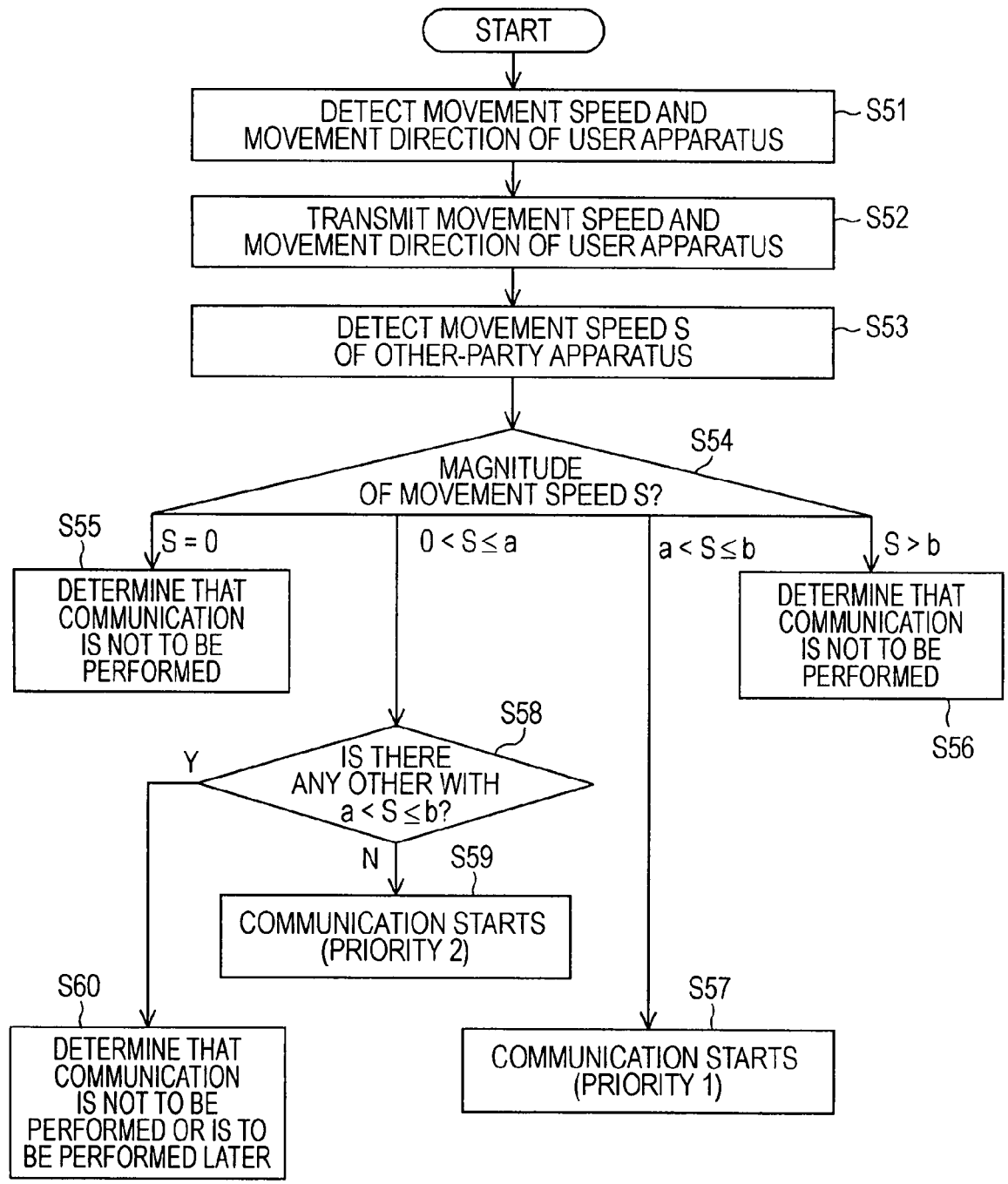
FIG. 18 is a flowchart illustrating the operation of a portable terminal of a fifth embodiment.

FIG. 18 shows an example of the flowchart of a processing operation when a portable terminal in the fifth embodiment is to start a data communication operation.

In this embodiment, at first, the CPU 11 detects the movement speed of the user apparatus by using the position of the user apparatus, which is measured by the GPS receiver section 72, and the detection output of the travel sensor 73 (step S51).

Next, the CPU 11 transmits by broadcast a packet in which the detected information on the movement speed and the movement direction of the user apparatus is contained to another terminal, or sends the packet to the server apparatus 60 (step S52).

Next, the CPU 11 extracts information on the movement speed of an arbitrary portable terminal from the information received from the arbitrary portable terminal, and detects the movement speed (step S53). Next, the CPU 11 makes a determination as to the magnitude S of the movement speed detected in step S53 (step S54).

When it is determined in step S54 that the magnitude S of the movement speed is 0, that is, a static state is reached, and is out of the communication condition range, the CPU 11 determines that communication is not to be performed with the arbitrary portable terminal (step S55) and exits from the processing routine.

Furthermore, when it is determined in step S54 that the magnitude S of the movement speed is greater than a predetermined fixed value b (b>0) and is out of the communication condition range, also, the CPU 11 determines that communication is not to be performed with the arbitrary portable terminal (step S56) and exits from the processing routine.

When it is determined in step S54 that the magnitude S of the movement speed is a<S≤b (a>0), by considering that the condition for the priority to be a first place at which communication is started is satisfied, the CPU 11 extracts the communication address information of the portable terminal satisfying the motion condition from the received information, and sends a communication request to the portable terminal of the communication address information. Then, upon receiving a response to the communication request from the portable terminal of the destination, the CPU 11 forms a communication channel between them, so that data communication is started (step S57).

When it is determined in step S54 that the magnitude S of the movement speed is 0<S≤a, by considering that the condition for the priority to be a second place at which communication is started is satisfied, the CPU 11 determines whether or not there is another portable terminal in which the priority is the first place (step S58). When it is determined in step S58 that there is no other portable terminal in which the priority is the first place, the CPU 11 extracts the communication address information of the portable terminal satisfying the motion condition from the received information and sends a communication request to the portable terminal of the communication address information. Upon receiving a response to the communication request, the CPU 11 forms a communication channel between them, so that data communication is started (step S59).

When it is determined in step S58 that there is another portable terminal in which the priority is the first place, the CPU 11 determines that communication is not to be performed with the arbitrary portable terminal or communication is to be performed later (step S60), and exits from the processing routine.

Other Embodiments and Modifications

In the above embodiments, motion of another portable terminal or of an in-vehicle apparatus is automatically detected, and when the communication motion condition is satisfied, data communication is performed. Alternatively, a communication request button may be provided in a portable terminal or an in-vehicle apparatus, so that only when the user operates the communication request button, the above-described function is performed.

In the above-described embodiments, phone voice data and music data are data-communicated. Data to be communicated is not limited to such data and, for example, electronic mail can also be transmitted and received. Furthermore, when the data communication apparatus is provided with a photo-taking function, transmission and reception of photo-taken data may be performed as data communication.

Data to be sent to the other-party side may be provided in advance on the data communication apparatus side that has made a communication request to start communication, and when the communication is started, the data that is provided in advance may be sent to the other-party side. For example, the data communication apparatus may be provided with means for obtaining biometric information of a user, such as the pulse, the number of breaths, and the number of heartbeats of the user, and the obtained biometric information may be sent to the other-party apparatus.

Furthermore, data stored on the other-party side of the data communication apparatus that has made a communication request may be obtained from the other-party apparatus when data communication is started.

In the above-described embodiments, in the communication motion condition setting section 23, a motion pattern selected from among a plurality of motion patterns that are provided in advance is set as a communication motion condition. Alternatively, motion of the other party with which the user starts data communication may be set and input. For example, in the embodiment of FIG. 18, the above-described values of a and b for the magnitude S of the movement speed of the other-party apparatus with which data communication is to be started may be set and input by a user.

The above-described embodiments show cases in which the present invention is applied to a portable terminal, such as a PDA. Alternatively, the present invention can be applied to a portable phone terminal or a game machine. For example, when the present invention is applied to a game machine, another game machine present in the neighborhood and in a static state, or a game machine being used by a user moving slightly can be detected, and data communication can be performed, making it possible to transmit and receive game data. Therefore, it becomes possible to enjoy a combat-type game or the like.

The invention claimed is:

1. A first data communication apparatus comprising:
   obtaining apparatus for receiving, by the first apparatus, information in a broadcast signal identifying a motion status of a distant second data communication apparatus;
   motion determination apparatus for determining, by the first apparatus, the motion of the distant second apparatus based on the information identifying the motion status received by the obtaining apparatus, wherein the motion of the second apparatus determined by the motion determination apparatus is representative of a static state, a moving state, being manually operated, walking, jogging, or movement of a vehicle;
   communication determination apparatus for determining, by the first apparatus, whether or not data communication is to be established with the distant second apparatus based on a motion determination of at least the distant second apparatus that is output by the motion determination apparatus; and
   communication apparatus for initiating the data communication with the distant second apparatus responsive to the communication determination apparatus determining that the data communication is to be established with the distant second apparatus.

2. The first data communication apparatus according to claim 1, wherein the communication apparatus is further configured to initiate two-way audio and/or visual communication with the distant second apparatus responsive to the communication determination apparatus determining that data communication is to be established with the distant second apparatus.

3. The first data communication apparatus according to claim 1, wherein the obtaining apparatus comprises apparatus for receiving information on the motion of the second apparatus from a server.

4. The first data communication apparatus according to claim 1, further comprising user apparatus motion detection apparatus for detecting a motion of a user apparatus that includes the first data communication apparatus,
   wherein the communication determination apparatus compares the motion of the second apparatus with the motion of the user apparatus and determines whether or not the data communication is to be performed with the second apparatus.

5. The first data communication apparatus according to claim 1, further comprising specification accepting apparatus for accepting a specification input representative of a motion of the second apparatus with which data communication is to be performed,
   wherein the communication determination apparatus determines whether or not the motion of the second apparatus is motion accepted by the specification accepting apparatus, and determines whether or not the data communication is to be performed with the second apparatus based on whether or not the motion of the second apparatus is motion accepted by the specification accepting apparatus.

6. A first data communication apparatus comprising:
   user apparatus motion detection apparatus for detecting a motion of a user apparatus;
   transmitting apparatus for transmitting a first motion detection result of the user apparatus motion detection apparatus;
   obtaining apparatus for receiving, by the first apparatus, a second motion detection result of a distant second apparatus in a broadcast signal, the second motion detection result being detected by the second apparatus and identifying a motion status of the second apparatus;
   motion determination apparatus for determining, by the first apparatus, the motion of the distant second apparatus based on the second motion detection result, wherein the motion of the second apparatus determined by the motion determination apparatus is representative of a static state, a moving state, being manually operated, walking, jogging, or movement of a vehicle;
   communication determination apparatus for determining, by the first apparatus, whether or not data communication is to be initiated with the distant second apparatus on at least the basis of motion determination output by the motion determination apparatus; and
   communication apparatus for initiating the data communication with the distant second apparatus when the communication determination apparatus determines that the data communication is to be initiated with the distant second apparatus.

7. The first data communication apparatus according to claim 6, wherein the communication apparatus is further configured to initiate two-way audio and/or visual communication with the distant second apparatus responsive to the communication determination apparatus determining that data communication is to be established with the distant second apparatus.

8. The first data communication apparatus according to claim 6, wherein the obtaining apparatus comprises apparatus for receiving the second motion detection result from a server.

9. The first data communication apparatus according to claim 6, wherein the obtaining apparatus comprises apparatus for receiving the second motion detection result from the second apparatus.

10. The first data communication apparatus according to claim 6, wherein the user apparatus motion detection apparatus comprises a sensor for detecting motion.

11. A data communication method comprising acts of:
    receiving, by a first apparatus, information in a broadcast signal representative of a motion of a distant second apparatus;
    determining, by the first apparatus, a motion status of the distant second apparatus based on the received information on the motion, wherein the motion status is determined to be representative of a static state, a moving state, a state of being manually operated, a walking state, a jogging state, or a state of movement of a vehicle;
    determining, by the first apparatus, whether or not data communication is to be initiated with the distant second apparatus based on the determined motion status; and
    initiating the data communication with the distant second apparatus when it is determined that data communication is to be initiated with the distant second apparatus.

12. A data communication method comprising acts of:
    identifying, by a first apparatus, a first motion of the first apparatus;

identifying, by the first apparatus, from information contained in a broadcast signal a second motion of a distant second apparatus, wherein the second motion of the distant second apparatus identified by the first apparatus is a static state, a moving state, a state of being manually operated, a walking state, a jogging state, or a state of movement of a vehicle;

determining, by the first apparatus, whether or not data communication is to be initiated between the first apparatus and the distant second apparatus based on the identified first motion and second motion; and initiating the data communication between the first apparatus and the distant second apparatus when it is determined that the data communication is to be initiated between the first apparatus and the distant second apparatus.

13. A first data communication apparatus comprising:

a receiver configured to receive data from a broadcast signal that is representative of motion of a distant second data communication apparatus;

a motion evaluator configured to determine at least one first motion parameter of the distant second apparatus from the received data, wherein the motion parameter of the distant second apparatus determined by the motion evaluator is representative of a static state, a moving state, a state of being manually operated, a walking state, a jogging state, or a state of movement of a vehicle;

a communication evaluator configured to determine whether or not to establish data communication between the first data communication apparatus and the distant second apparatus based on the at least one first motion parameter; and communication components configured to initiate the data communication between the first data communication apparatus and distant second apparatus responsive to a result determined by the communication evaluator that indicates that communication is to be established between the first data communication apparatus and the distant second apparatus.

14. The first data communication apparatus of claim 13, further comprising a motion sensor to sense motion of the first data communication apparatus, wherein the motion evaluator is further configured to determine at least one second motion parameter of the first data communication apparatus and the communication evaluator is further configured to determine whether or not to establish the data communication between the first data communication apparatus and the second apparatus based on the at least one first motion parameter and the at least one second motion parameter.

15. The first data communication apparatus of claim 14, wherein the communication evaluator is configured to establish the data communication between the first data communication apparatus and the second apparatus when the at least one first motion parameter and the at least one second motion parameter indicate a similar motion state for the first data communication apparatus and second apparatus.

16. The first data communication apparatus of claim 15, wherein the communication evaluator is further configured to initiate two-way audio and/or visual communication between the first data communication apparatus and the second apparatus responsive to the communication evaluator determining that data communication is to be established between the first data communication apparatus and the second apparatus.

17. The first data communication apparatus of claim 13, wherein the communication evaluator is configured to establish the two-way audio and/or visual data communication between the first data communication apparatus and the second apparatus responsive to the at least one first motion parameter being representative of a motion state selected from the group consisting of: static, manually operated, walking, jogging, movement of a vehicle, and moving.

* * * * *